(12) United States Patent
Urbach

(10) Patent No.: US 6,206,132 B1
(45) Date of Patent: Mar. 27, 2001

(54) VEHICLE ELECTRIC STEERING APPARATUS

(75) Inventor: Brian A. Urbach, Rochester Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/324,320

(22) Filed: Jun. 2, 1999

(51) Int. Cl.$^7$ .................................................. B62D 5/00
(52) U.S. Cl. .................. 180/402; 180/408; 180/444; 403/122; 403/359
(58) Field of Search .................. 280/93.511, 93.512, 280/124.127, 124.154; 180/402, 408, 413, 443, 444, 6.44, 6.48, 6.5; 403/122, 123, 126, 128, 132, 133, 359

(56) References Cited

U.S. PATENT DOCUMENTS

| | | | |
|---|---|---|---|
| 1,780,370 | * 11/1930 | Tenney | 180/408 |
| 3,604,725 | * 9/1971 | Goff | 280/124.127 |
| 3,741,581 | * 6/1973 | Patrin | 280/124.127 |
| 3,826,322 | * 7/1974 | Williams | 180/443 |
| 4,162,859 | * 7/1979 | McAfee | 280/93.511 |
| 4,972,914 | 11/1990 | Asanuma . | |
| 4,995,633 | * 2/1991 | Santo | 280/93.512 |
| 5,022,476 | * 6/1991 | Weege | 180/443 |
| 5,253,726 | * 10/1993 | Weyer | 180/402 |
| 5,799,968 | * 9/1998 | Loeffler | 280/93.511 |
| 5,884,724 | * 3/1999 | Bohner et al. | 180/402 |
| 6,059,068 | * 5/2000 | Kato et al. | 180/402 |

* cited by examiner

Primary Examiner—Daniel G. DePumpo
(74) Attorney, Agent, or Firm—Tarrolli, Sundheim, Covell, Tummino & Szabo L.L.P.

(57) ABSTRACT

A steering apparatus (10) for use in a vehicle (12) having a steerable road wheel (14), a steering member (30) supporting the road wheel for rotation relative to the steering member, and at least one vehicle suspension part (22) supporting the steering member for pivotal movement about a steering axis (44). The steering apparatus (10) includes a bearing (70). The steering apparatus (10) also includes a ball stud (50) having a shank portion (54) fixed to the steering member (30). The ball stud (50) has a ball end portion (52) rotatably and pivotally mounted in the bearing (70). The ball stud (50) has an axis (56). The steering apparatus (10) includes an actuatable electric motor (90) having an output shaft (92) and operable to rotate the output shaft in opposite directions. The steering apparatus (10) also includes a joint assembly (100) connecting the ball end portion (52) of the ball stud (50) for rotation with the output shaft (92) of the electric motor (90). The electric motor (90) when actuated rotates the ball stud (50) about the ball stud axis (56) thereby effecting pivotal movement of the steering member (30) about the steering axis (44).

7 Claims, 2 Drawing Sheets

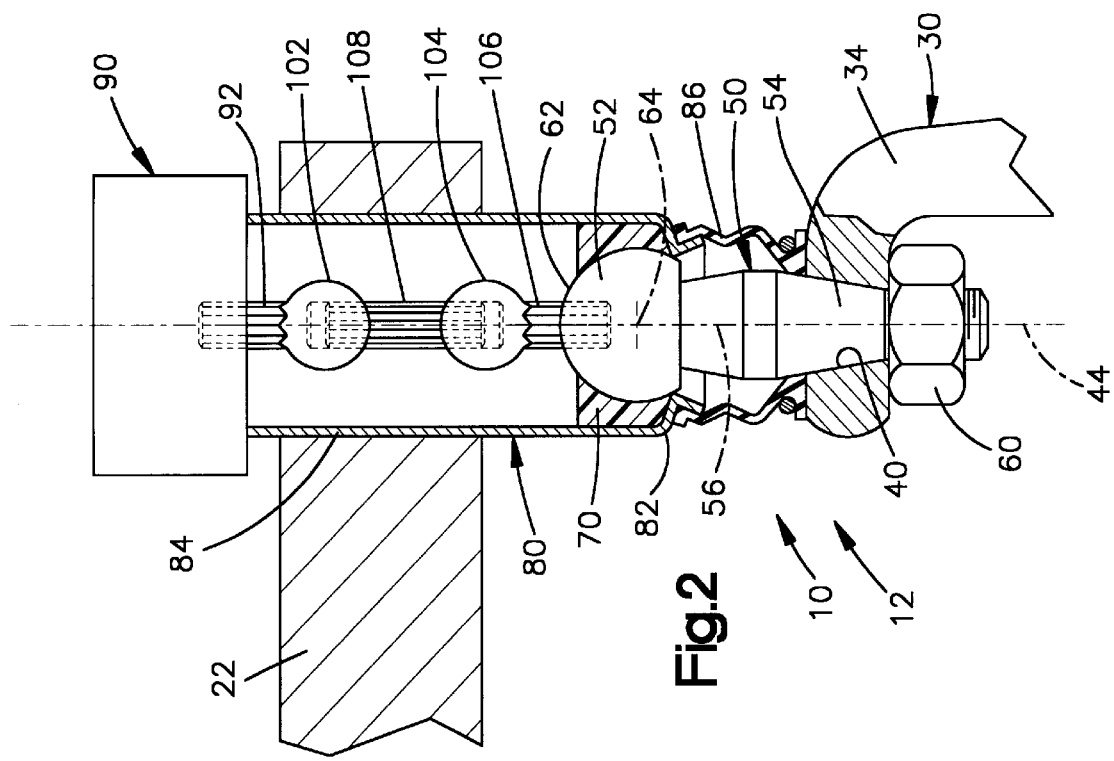
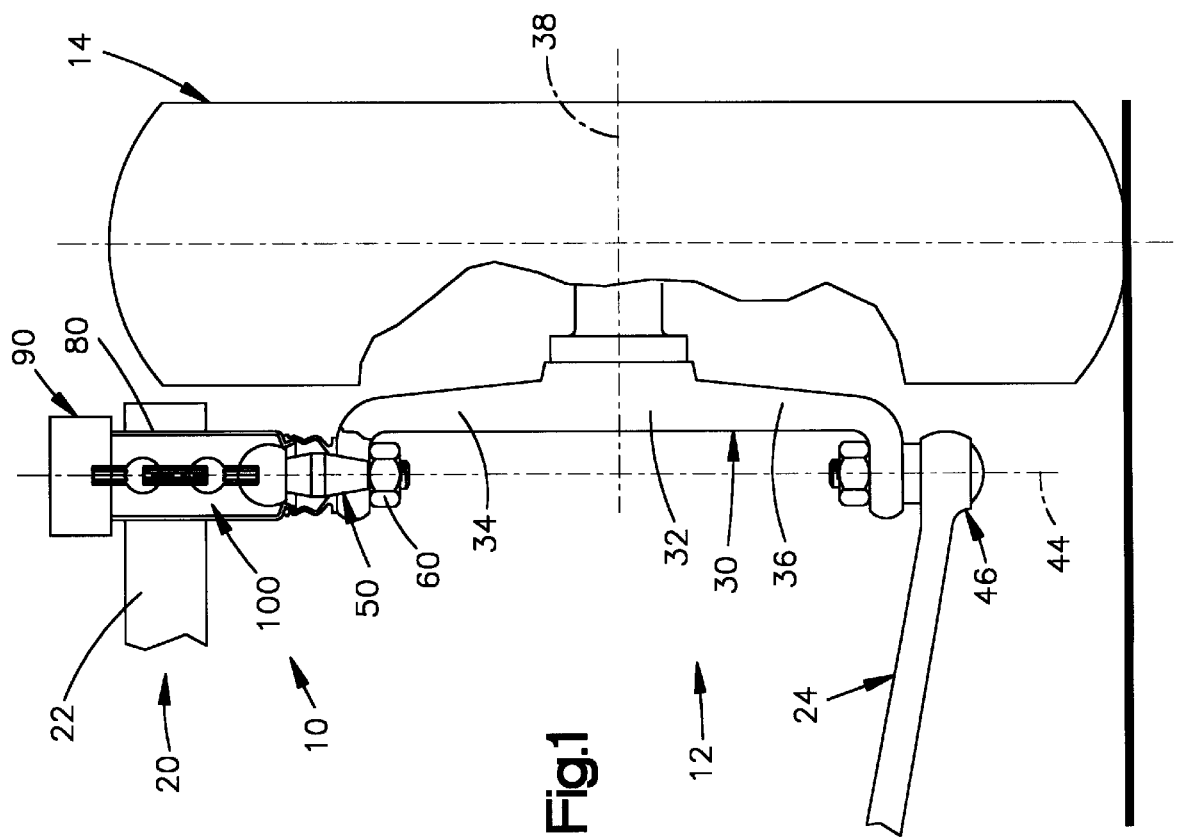

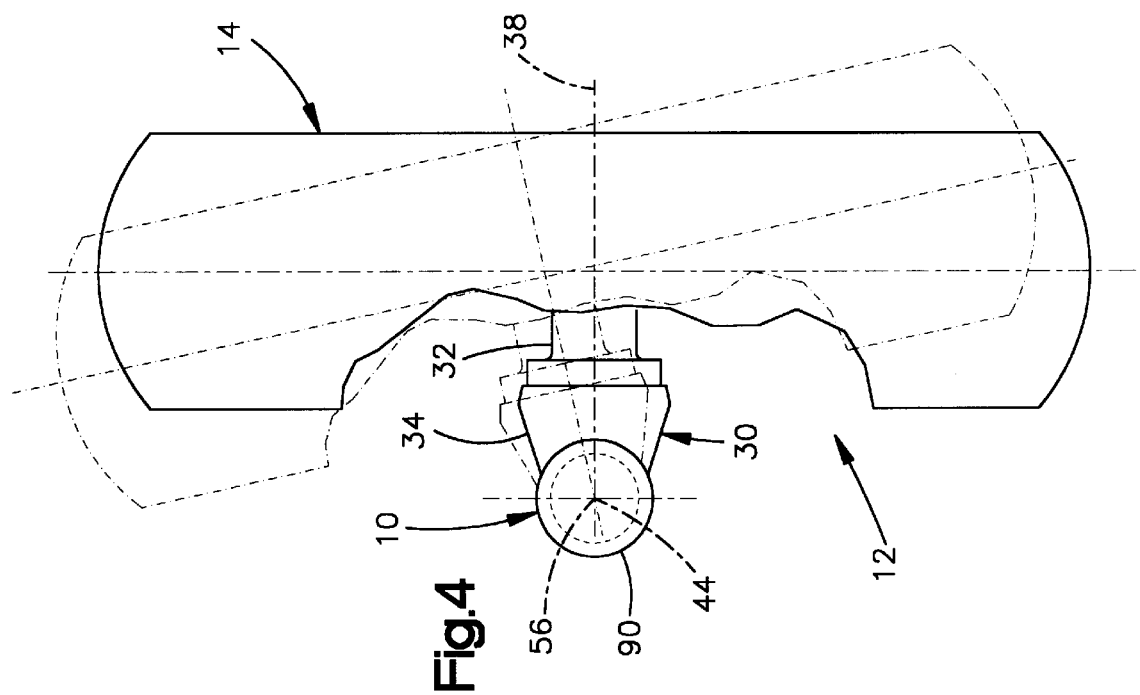
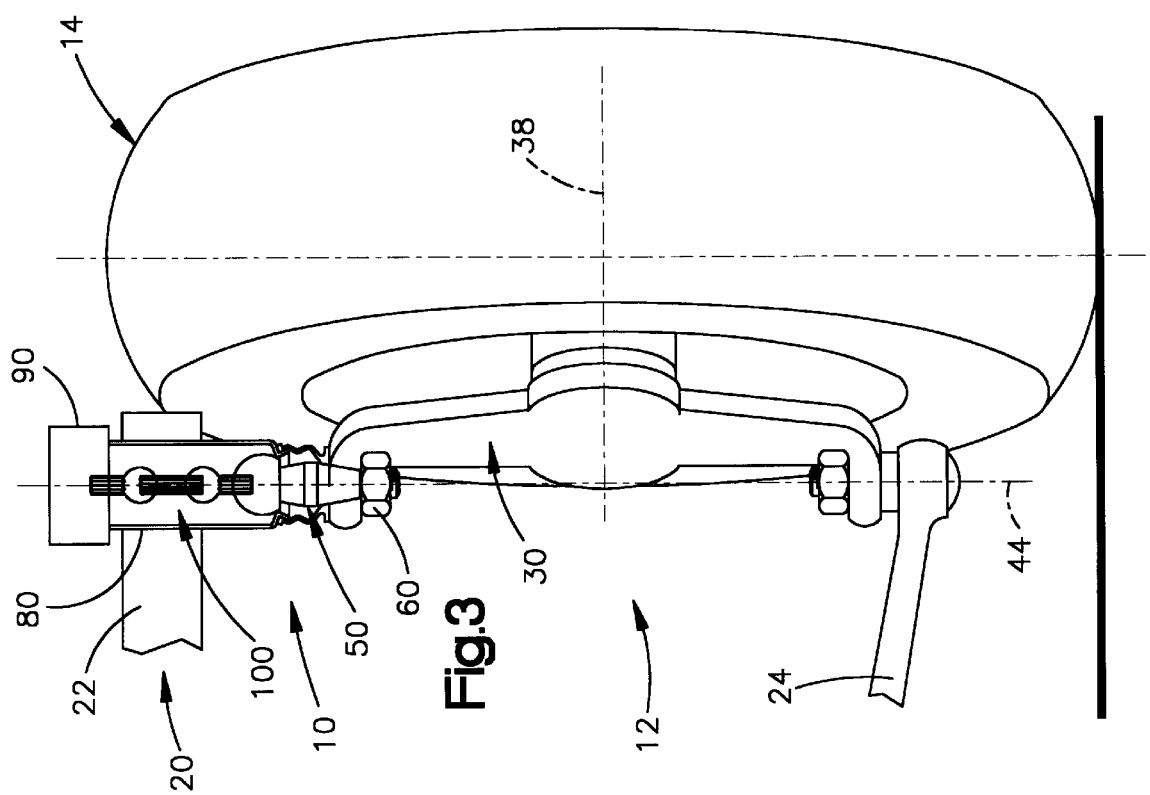

VEHICLE ELECTRIC STEERING APPARATUS

BACKGROUND OF THE INVENTION

1. Technical Field

The present invention relates to a steering apparatus for a vehicle. In particular, the present invention relates to a vehicle steering apparatus including an electric motor for effecting steering movement of a steerable road wheel of a vehicle.

2. Description of the Prior Art

A motor vehicle includes a steering system for steering the steerable road wheels, typically the front wheels, of the vehicle. The steering system often includes a steering gear assembly located remote from the steerable wheels of the vehicle, for example, at the steering column. U.S. Pat. No. 4,972,914 discloses a vehicle steering system located adjacent a steerable wheel of the vehicle. The steering system includes an electric motor mounted with a McPherson strut. Actuation of the motor rotates the piston of the strut to steer the steerable wheel of the vehicle.

SUMMARY OF THE INVENTION

The present invention is a steering apparatus for use in a vehicle having (a) a steerable road wheel, (b) a steering member supporting the road wheel for rotation relative to the steering member, and (c) at least one vehicle suspension part supporting the steering member for pivotal movement about a steering axis. The steering apparatus includes a bearing. The steering apparatus also includes a ball stud having a shank portion fixed to the steering member. The ball stud has a ball end portion rotatably and pivotally mounted in the bearing. The ball stud has an axis. The steering apparatus includes an actuatable electric motor having an output shaft and operable to rotate the output shaft in opposite directions. The steering apparatus also includes a joint assembly connecting the ball end portion of the ball stud for rotation with the output shaft of the electric motor. The electric motor when actuated rotates the ball stud about the ball stud axis thereby effecting pivotal movement of the steering member about the steering axis.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic illustration of a portion of a vehicle including a steerable wheel shown in a first orientation and a steering apparatus constructed in accordance with the present invention;

FIG. 2 is an enlarged view of the steering apparatus of FIG. 1;

FIG. 3 is a view similar to FIG. 1 showing the steerable wheel in a second orientation; and FIG. 4 is a top plan view showing the steerable wheel in the second orientation.

DESCRIPTION OF A PREFERRED EMBODIMENT

The present invention relates to a steering apparatus for a vehicle. In particular, the present invention relates to a vehicle steering apparatus including an electric motor for effecting steering movement of a steerable road wheel of a vehicle. The present invention is applicable to various steering apparatus constructions. As representative of the invention, FIG. 1 illustrates a steering apparatus 10 for a vehicle 12. The vehicle 12 has a steerable road wheel 14. The steerable road wheel 14 may be either a front wheel of the vehicle 12 or a rear wheel of the vehicle.

The road wheel 14 is connected with the vehicle body (not shown) by a vehicle suspension 20. The vehicle suspension 20 is of a generally conventional construction and includes an upper control arm indicated schematically at 22. The vehicle 12 also includes a tie rod 24 and a steering knuckle 30. It should be understood that the steering apparatus 10 of the present invention is applicable to other suspension types and configurations.

The steering knuckle 30 has a central portion 32 and upper and lower arms 34 and 36. The central portion 32 of the steering knuckle 30 supports the road wheel 14 for rotation about an axis 38. The upper arm 34 of the steering knuckle 30 has a tapered opening 40. A corresponding opening (not shown) is formed in the lower arm 36 of the steering knuckle 30. The openings in the upper and lower arms 34 and 36 of the steering knuckle 30 define a steering axis 44 of the suspension 20. The openings are preferably centered on the steering axis 44.

The tie rod 24 is connected by a lower ball joint 46 to the lower arm 36 of the steering knuckle 30. The upper control arm 22 is connected by the steering apparatus 10 with the upper arm 34 of the steering knuckle 30.

The steering apparatus 10 includes a ball stud 50. The ball stud 50 has a ball end portion 52 and a shank portion 54, both centered on an axis 56 of the ball stud.

The shank portion 54 of the ball stud 50 is received in the opening 40 in the upper arm 34 of the steering knuckle 30. A nut 60 is screwed onto the shank portion 54 of the ball stud 50. The nut 60 secures the ball stud 50 to the upper arm 34 of the steering knuckle 30. The ball stud 50 is thus fixed for movement with the steering knuckle 30.

The ball end portion 52 of the ball stud 50 has a generally spherical configuration including a spherical outer side surface 62 centered on a pivot center 64 of the ball stud 56. The pivot center 64 is located on the axis 56 of the ball stud 50. In the illustrated embodiment, the ball stud 50 is mounted in the steering knuckle 30 in a manner so that the axis 56 of the ball stud is collinear with the steering axis 44.

The steering apparatus 10 also includes a bearing 70 which receives the ball end portion 52 of the ball stud 50. The bearing 70 is made from a known plastic material suitable for use as a ball joint bearing.

The bearing 70 is supported in a housing or shell of the steering apparatus 10, shown schematically at 80. The shell 80 is a rigid member having a first end portion 82 which encloses and supports the bearing 70. An opposite second end portion 84 of the shell 80 is secured to the upper control arm 22. The shell 80 is thus fixed for movement with the upper control arm 22. A bellows 86 seals between the second end portion 84 of the shell 80 and the shank portion 54 of the ball stud 50.

An electric motor 90 is connected to the shell 80. The motor 90 is preferably a stepper motor. The motor 90 has an output shaft 92 which is rotatable in opposite directions upon actuation of the motor.

The steering apparatus 10 includes a joint assembly 100 for interconnecting the output shaft of the motor 90 with the ball stud 50. The joint assembly 100 includes a first constant velocity joint indicated schematically at 102, and a second constant velocity joint indicated schematically at 104. The second constant velocity joint 104 has a portion 106 fixed to the ball end portion 52 of the ball stud 50, and extending along the axis 56 of the ball stud.

The joint assembly 100 also includes a slip joint indicated schematically at 108. The slip joint 108 extends between and interconnects the first and second constant velocity joints 102 and 104.

The joint assembly 100 enables relative movement between the electric motor 90 and the ball stud 50, in a plurality of degrees of freedom. Specifically, the slip joint 108 enables relative movement between the motor 90 and the ball stud 50 in a direction between the first and second constant velocity joints 102 and 104. The first and second constant velocity joints 102 and 104 enable pivotal and rotational movement between the electric motor 90 and the ball stud 50. The steering apparatus 10 thus interconnects the steering knuckle 30 and the upper control arm 22 for pivotal and rotational movement, to enable normal movement of the road wheel 14 relative to the vehicle body.

The electric motor 90 is actuatable by known vehicle electric circuitry (not shown) including, for example, a torque sensor and a controller. The vehicle electric circuitry is responsive to rotation of the vehicle steering wheel (not shown).

When it is desired to change the direction of travel of the vehicle, rotation of the vehicle steering wheel results in actuation of the electric motor 90. The output shaft 92 of the motor 90 rotates about the axis of the motor. The rotational force of the output shaft 92 is transmitted through the joint assembly 100 into the ball end portion 52 of the ball stud 50. The ball stud 50 rotates about its axis 56.

Because the shank portion 54 of the ball stud 50 is fixed in the upper arm 34 of the steering knuckle 30, rotational force from the electric motor 90 is transmitted through the ball stud 50 into the upper arm of the steering knuckle. The steering knuckle 30 pivots in a first direction about the steering axis 44, thus effecting steering movement of the road wheel 14. Actuation of the electric motor 90 in the opposite direction results in steering movement of the road wheel 14 in an opposite, second direction. The joint assembly 100 makes steering movement possible throughout the range of pivotal and rotational movement of the steering knuckle 30 relative to the upper control arm 22.

From the above description of the invention, those skilled in the art will perceive improvements, changes and modifications in the invention. For example, a separate steering apparatus can be provided for each steerable road wheel of a vehicle. The steering apparatus can be connected through a lower ball joint of a vehicle instead of an upper ball joint. Such improvements, changes and modifications within the skill of the art are intended to be covered by the appended claims.

Having described the invention, I claim:

1. An apparatus comprising:

a bearing;

a ball stud having a shank portion and a ball end portion rotatably and pivotally mounted in said bearing, said ball stud having an axis;

an actuatable electric motor having an output shaft and operable to rotate said output shaft in opposite directions; and a joint assembly interconnecting said ball end portion of said ball stud for rotation with said output shaft of said electric motor, said joint assembly having first and second constant velocity joints and a slip joint interconnecting said first and second velocity joints at a first location, said first constant velocity joint being connected to said output shaft of said electric motor at a second location opposite said first location, said second constant velocity joint having an integral portion connecting said second constant velocity joint and said ball end portion of said ball stud at a second location opposite said first location;

said joint assembly enabling said electric motor when actuated to rotate said ball stud about said ball axis.

2. An apparatus as set forth in claim 1 including a housing, said bearing being supported in said housing.

3. An apparatus as set forth in claim 2 wherein said ball stud axis is collinear with the steering axis.

4. An apparatus as set forth in claim 2 wherein the steering member is a steering knuckle.

5. An apparatus as set forth in claim 2 including a housing, said bearing being supported in said housing, said housing being secured to said at least one vehicle suspension part.

6. An apparatus as set forth in claim 2 wherein said steering apparatus is disposed in a force-transmitting relationship between the steering member and the at least one vehicle suspension part.

7. A vehicle steering apparatus comprising:

a steerable road wheel, a steering member supporting the road wheel for rotation relative to the steering member, and at least one vehicle suspension part supporting the steering member for pivotal movement about a steering axis;

a bearing;

a ball stud having a shank portion fixed to the steering member, said ball stud having a ball end portion rotatably and pivotally mounted in said bearing, said ball stud having an axis;

an actuatable electric motor having an output shaft and operable to rotate said output shaft in opposite directions; and a joint assembly interconnecting said ball end portion of said ball stud for rotation with said output shaft of said electric motor, said joint assembly having first and second constant velocity joints and a slip joint interconnecting said first and second velocity joints at a first location, said first constant velocity joint being connected to said output shaft of said electric motor at a second location opposite said first location, said second constant velocity joint having an integral portion connecting said second constant velocity joint and said ball end portion of said ball stud at a second location opposite said first location, said electric motor when actuated rotating said ball stud about said ball stud axis thereby effecting pivotal movement of the steering member about the steering axis.

* * * * *